United States Patent
Kimura et al.

[11] Patent Number: 6,092,997
[45] Date of Patent: Jul. 25, 2000

[54] COMPRESSOR

[75] Inventors: Naofumi Kimura; Akira Nakamoto; Masakazu Obayashi; Satoshi Koumura, all of Kariya, Japan

[73] Assignee: Kabushiki Kaisha Toyoda Jidoshokki Seisakusho, Kariya, Japan

[21] Appl. No.: 09/187,724

[22] Filed: Nov. 5, 1998

[30] Foreign Application Priority Data

Nov. 28, 1997 [JP] Japan .................................... 9-328751

[51] Int. Cl.⁷ ............................ F04B 27/08; F04B 49/00
[52] U.S. Cl. ........................ 417/269; 417/365; 417/223; 417/319
[58] Field of Search .................... 417/223, 269, 417/319, 362, 365

[56] References Cited

U.S. PATENT DOCUMENTS

| | | | |
|---|---|---|---|
| 4,138,203 | 2/1979 | Slack | 417/269 |
| 4,235,116 | 11/1980 | Meijer et al. | 417/269 |
| 4,433,596 | 2/1984 | Scalzo | 417/269 |
| 4,836,090 | 6/1989 | Smith | 417/269 |
| 5,219,273 | 6/1993 | Chang | 417/319 |
| 5,730,249 | 3/1998 | Shimizu | 417/269 |
| 5,975,860 | 11/1999 | Obayashi et al. | 417/223 |

FOREIGN PATENT DOCUMENTS 5-33787  2/1993  Japan .

*Primary Examiner*—Willis R. Wolfe
*Attorney, Agent, or Firm*—Woodcock Washburn Kurtz Mackiewicz & Norris LLP

[57] ABSTRACT

A compressor having a rotating member, which includes a drive shaft and a swash plate. A piston compresses gas and torsionally vibrates the rotating member. A damper is coupled to the shaft to reduce torsional vibrations of the rotating member. The natural frequency of the damper is substantially equal to that of the rotating member. The damper includes a metal pin coupled to the shaft, a weight coupled to the rotating member, and a rubberlike body arranged between the shaft and the weight. The pin functions as a spring acting in the direction of the torsional vibrations and has a spring constant that remains substantially the same within the operating temperature range of the compressor. The weight is vibrated torsionally with the rotating member by the pin to offset the torsional vibrations of the rotating member. The natural frequency of the damper is determined mainly by the mass of the weight and the spring constant of the pin. The rubberlike body absorbs the torsional vibrations of the rotating member and has a spring constant smaller than that of the pin such that the natural frequency of the damper is substantially unaffected by the rubberlike body.

15 Claims, 3 Drawing Sheets

COMPRESSOR

BACKGROUND OF THE INVENTION

The present invention relates to compressors employed in, for example, air conditioners for vehicles. More particularly, the present invention relates to compressors that suppress the production of vibrations and noise.

A known type of compressor employs a swash plate, which is secured to a drive shaft and coupled to pistons. In a swash plate compressor, the rotation of the swash plate is converted to the reciprocation of the pistons to compress refrigerant gas. Screw compressors, which employ a pair of screw-like rotors to compress fluid, are also known in the prior art.

In both swash plate and screw compressors, fluctuations of the torque applied to the drive shaft or the rotor and flucutations of the compression reaction forces acting on the swash plate or the rotor during compression produce vibrations. The vibrations increase the noise level of the compressor.

To reduce vibrations and suppress noise, the employment of dampers has been proposed. For example, Japanese Unexamined Patent Publication No. 5-33787 describes a screw compressor having two rotors 70 as shown in FIG. 5. One of the rotors 70 is supported by a shaft 71. A damper 72, which is a conventional dynamic damper, is engaged with the shaft 71. The damper 72 includes a spring 73, which is connected with the shaft 71, and a weight 74, which is coupled to the spring 73. The damper 72 has a natural frequency that is determined by the spring constant of the spring 73 and the mass of the weight 74. The natural frequency of the damper 72 is about the same as the maximum axial vibrating frequency of the rotor 70. In other words, the frequency of the damper 72 and the frequency of the rotor 70 are in the same range. Therefore, the vibrations of the damper 72 offset the axial vibrations of the rotor 70 and thus reduce noise-producing vibrations.

The above publication also teaches the employment of a rubber body in lieu of the spring 73. In the same manner as when using the spring 73, if the axial vibrating frequency of the rotor 70 is included in the same range as the natural frequency of the damper, vibrations are reduced.

However, despite the drastic decrease in the frequency peak of the rotor 70, the rotor 70 would still vibrate axially when its vibration frequency is outside the natural frequency range of the damper 72. Thus, the reduction of vibrations is insufficient.

If the damper employs the rubber body, the natural frequency of the damper is varied greatly by the temperature of the rubber body. This is because the spring constant of the rubber body, which determines the natural frequency of the damper, varies in accordance with the temperature.

Compression reaction forces fluctuate the torsion acting on the rotor 70 and produce vibrations (torsional vibrations). Such torsional vibrations can be reduced by a dynamic damper having an elastic body, which serves as a spring acting in the torsional direction, and a weight. However, this damper, which reduces torsional vibrations, has the same deficiency as the damper 72, which reduces axial vibrations, in that the reduction of vibrations is insufficient.

Axial and torsional vibrations of the drive shaft and the swash plate also occur in swash plate compressors. However, it is apparent that the application of the damper employed in the above screw compressor would not sufficiently reduce vibrations in a swash plate compressor.

SUMMARY OF THE INVENTION

Accordingly, it is an objective of the present invention to provide an improved compressor that suppresses the production of vibrations.

To achieve the above objective, the present invention provides a compressor having a rotating member, which includes an integrally rotating drive shaft, a compressing member driven by the rotating member to compress fluid, which causes torsional vibrations of the rotating member, and a damper for decreasing the torsional vibrations of the rotating member. The damper has a natural frequency substantially equal to that of the rotating member. The damper includes a spring member coupled to the rotating member. The spring member functions as a torsional spring acting in the direction of the torsional vibration and is made of a material having a spring constant that remains substantially within the operating temperature range of the compressor. A weight is coupled to the rotating member by the spring member. The weight is vibrated torsionally with the rotating member by the spring member to offset the torsional vibrations of the rotating member. The natural frequency of the damper is determined mainly by the mass of the weight and the spring constant of the spring member. An absorbing member is arranged between the rotating member and the weight to absorb torsional vibrations of the rotating member. The absorbing member has a spring constant smaller than that of the spring member such that the natural frequency of the damper is substantially unaffected by the absorbing member.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
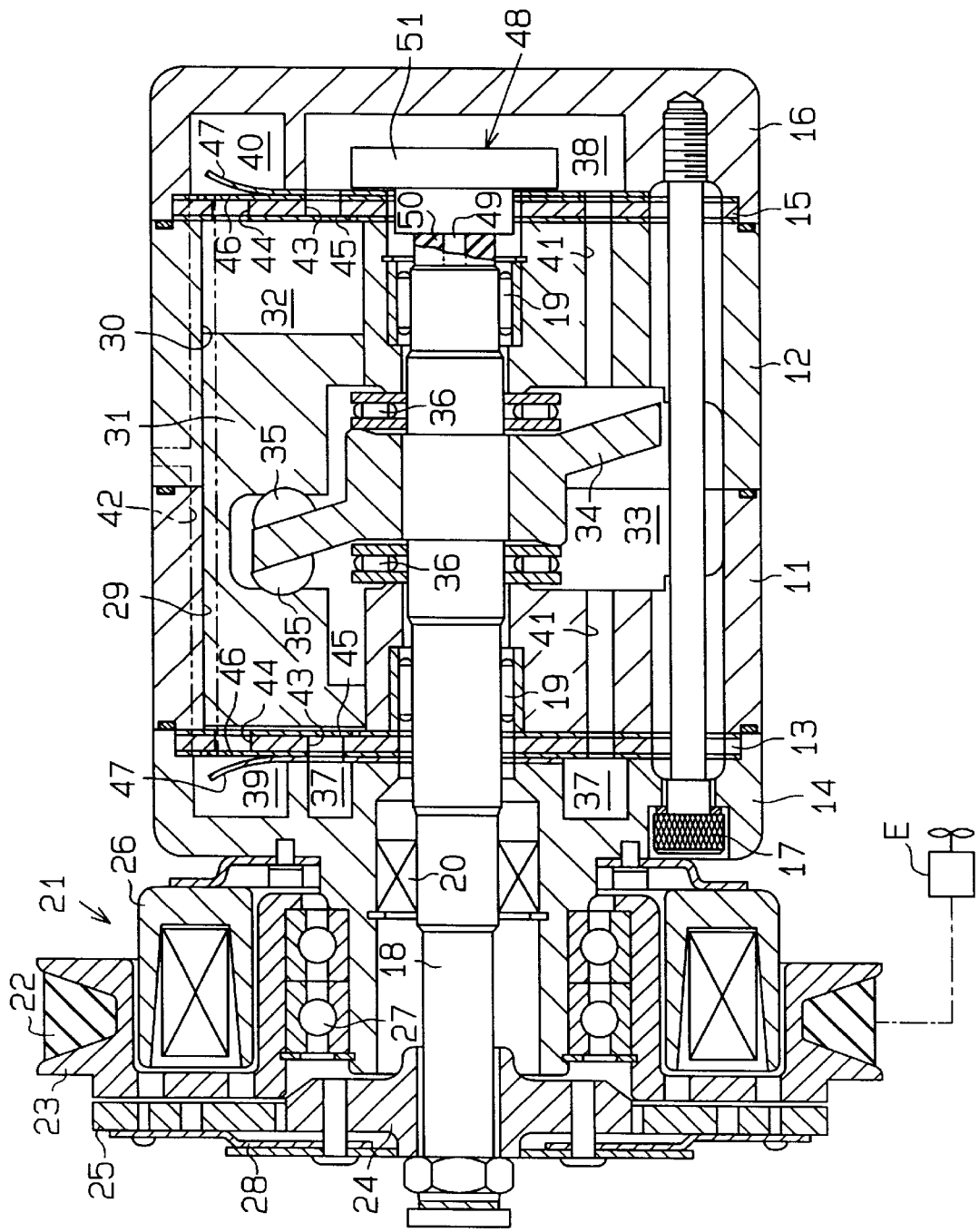
FIG. 1 is a cross-sectional view showing a compressor according to the present invention.

A compressor according to the present invention will now be described with reference to FIGS. 1 to 4. As shown in FIG. 1, a front cylinder block 11 and a rear cylinder block 12 are coupled to each other at the midsection of the compressor. The front cylinder block 11 has a front end, which is coupled to a front housing 14 by way of a valve plate 13. The rear cylinder block 12 has a rear end, which is coupled to a rear housing 16 by way of a valve plate 15. The cylinder blocks 11, 12, the valve plates 13, 15, the front housing 14, and the rear housing 16 are fastened together by a plurality of bolts 17 and form a compressor housing.

A drive shaft 18 is rotatably supported by a pair of radial bearings 19 and extends through the center of the cylinder blocks 11, 12 and the front housing 14. The drive shaft 18 has a front end projecting from the front housing 14. A lip seal 20 seals the space between the drive shaft 18 and the front housing 14. A clutch 21 is arranged at the front end of the drive shaft 18. The clutch 21 is connected to an external drive source E, such as an engine, by a belt 22 and functions to selectively transmit the power of the drive source E to the drive shaft 18.

The clutch 21 includes a pulley 23, an inner hub 24, an armature 25, and a solenoid 26. A support tube is defined at the front portion of the front housing 14. A pair of bearings 27 are fitted on the support tube to rotatably support the pulley 23. The belt 22 is wound onto the pulley 23. The inner hub 24 is fixed to the front end of the drive shaft 18. The armature 25 is fixed to the inner hub 24 by a leaf spring 28. The solenoid 26 is fixed to the front housing 14 and arranged in the pulley 23 at a position opposing the armature 25.

A plurality of equally spaced front cylinder bores 29 extend through the front cylinder block 11, while a plurality of equally spaced rear cylinder bores 30, each of which is aligned with one of the rear cylinder bores 30, extend through the rear cylinder block 12. Each set of aligned cylinder bores 29, 30 is parallel to the axis of the drive shaft 18, and the axes of the bores 29, 30 define a circle, the center of which coincides with the drive shaft axis. A double-headed piston 31 having a front head and a rear head is accommodated in each set of cylinder bores 29, 30. A compression chamber 32 is defined between the front head of the piston 31 and the valve plate 13 and between the rear head of the piston 31 and the valve plate 15.

A crank chamber 33 is defined in the cylinder blocks 11, 12. A swash plate 34 is fixed to the drive shaft 18 in the crank chamber 33. The swash plate 34 is coupled to each piston 31 by a pair of semispheric shoes 35. The rotation of the drive shaft 18 causes the swash plate 34 to reciprocate each piston 31. A thrust bearing 36 is arranged between each side of the swash plate 34 and the inner central end of the associated cylinder block 11, 12. In other words, the thrust bearings 36 hold the swash plate 34 between the cylinder blocks 11, 12.

A suction chamber 37 and a discharge chamber 39, which encompasses the suction chamber 37, are defined in the front housing 14. In the same manner, a suction chamber 38 and a discharge chamber 40, which encompasses the suction chamber 38, are defined in the rear housing 16. The suction chambers 37, 38 are each connected to the crank chamber 33 by a suction passage 41, which extends through the associated cylinder block 11, 12 and valve plate 13, 15. The crank chamber 33 is connected to an external refrigerant circuit (not shown) through a compressor inlet (not shown). The discharge chambers 39, 40 are each connected to the external refrigerant circuit by a compressor outlet (not shown) and a discharge passage 42, which extends through the associated cylinder block 11, 12 and valve plate 13, 15.

Suction ports 43 are defined on each valve plate 13, 15 in correspondence with each compression chamber 32 to connect each compression chamber 32 with the associated suction chamber 37, 38. In the same manner, discharge ports 44 are defined on each valve plate 13, 15 in correspondence with each compression chamber 32 to connect each compression chamber 32 with the associated discharge chamber 39, 40. A suction flap 45 is provided for each suction port 43 on the valve plates 13, 15 to close the suction port 43. A discharge flap 46 is provided for each discharge port 44 on the valve plates 13, 15 to close the discharge port 44. A retainer 47 is secured to each valve plate 13, 15 to restrict the maximum opening angle of each discharge flap 46.

Figure 2:
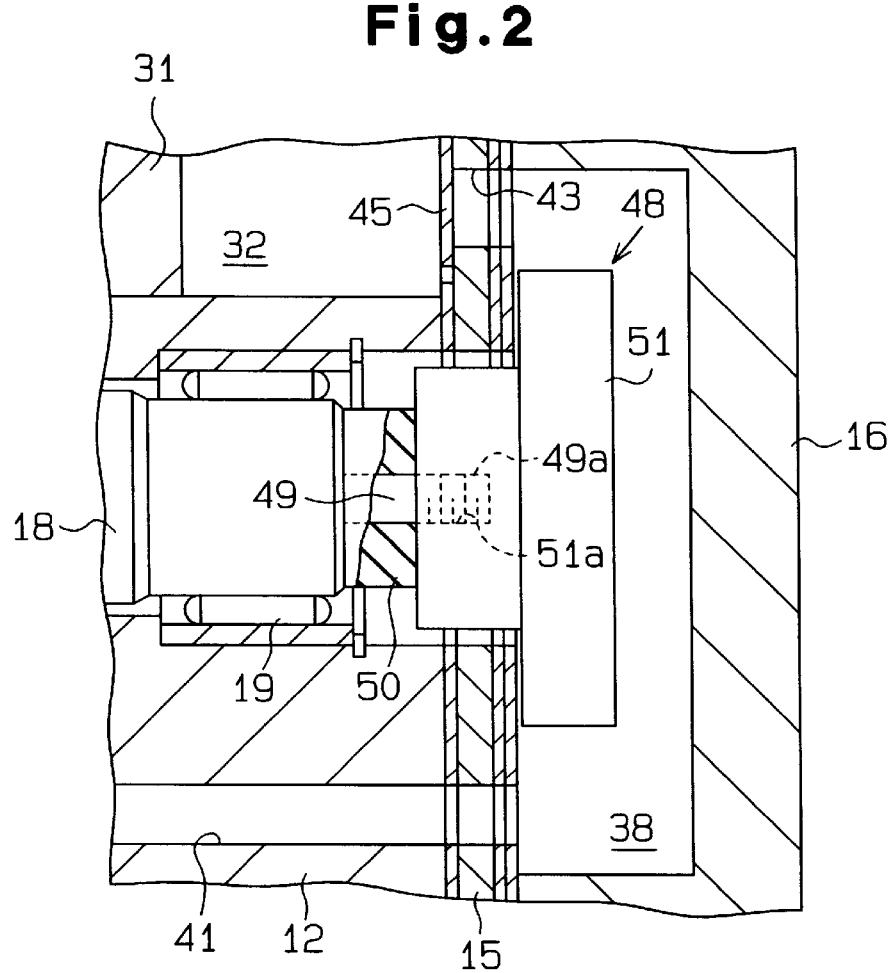
FIG. 2 is an enlarged partial cross-sectional view showing the damper of FIG. 1.
Figure 3:
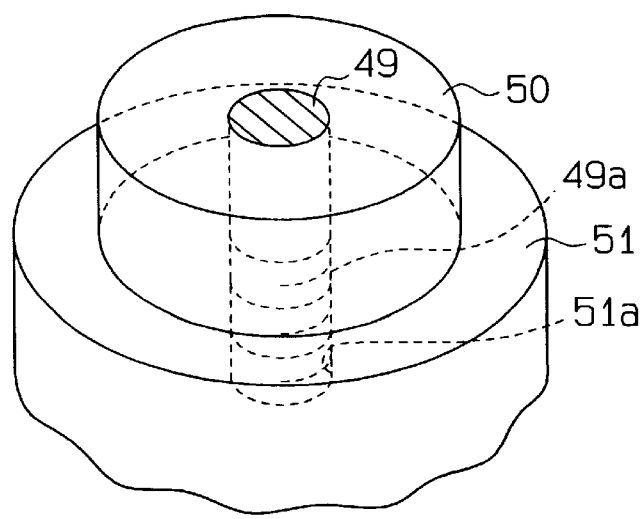
FIG. 3 is a perspective view showing the damper of FIG. 2.
Figure 4:
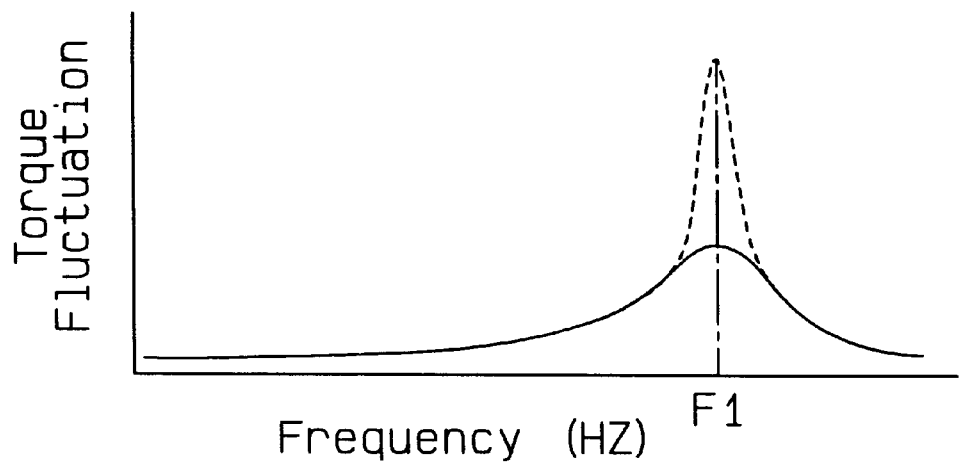
FIG. 4 is a graph showing the relationship between the torsional vibration amplitude and the torsional vibration frequency.

A damper 48 is engaged with the rear end of the drive shaft 18 in the rear suction chamber 38 to suppress the torsional vibrations of the drive shaft 18. As shown in FIGS. 2 and 3, the damper 48 includes a metal pin 49, which extends from the rear end of the drive shaft 18, a rubberlike body 50, which surrounds the metal pin 49, and a weight 51, which is connected to the rear end of the drive shaft 18 by the metal pin 49 and the rubberlike body 50.

The metal pin 49, the weight 51, and the drive shaft 18 are coaxial. The metal pin 49 functions as a torsional spring. The rubberlike body 50 functions to absorb the torsional vibrations of the metal pin 49. The metal pin 49 has a torsional spring constant that remains substantially the same throughout the operational temperature range of the compressor. The material and form of the rubberlike body 50 are determined such that its torsional spring constant is smaller than that of the metal pin 49. Thus, the rubberlike body 50 does not have much effect as a torsional spring. Accordingly, the natural frequency of the damper 48 is determined mainly by the mass of the weight 51 and the spring constant of the metal pin 49. The rubberlike body 50 is preferably made of rubber or elastomer. Butyl rubber is preferred as the material of the rubberlike body 50. However, other types of rubber or materials other than rubber may be used to form the rubberlike body 50 as long as the above conditions are satisfied.

The metal pin 49 is formed integrally with the drive shaft 18. The rubberlike body 50 is tubular so that it can be fitted on the metal pin 49. The distal end of the metal pin 49 has male threads 49a. The weight 51 has female threads 51a to engage the male threads 49a of the metal pin 49 and thus connect the weight 51 to the drive shaft 18. The rubberlike body 50 is fitted on the metal pin 49 before fastening the weight 51 to the pin 49. A key (not shown) is arranged between the pin 49 and the weight 51 to prevent the weight 51 from becoming loose.

The rubberlike body 50 can be fixed securely to the end faces of the drive shaft 18 and the weight 51. The rubberlike body 50 can also be arranged such that the rubberlike body 50 merely contacts the drive shaft 18 and the weight 51. An adhesive or a vulcanizing adhesive may be used to fix the rubberlike body 50 to the drive shaft 18 and the weight 51. If the rubberlike body 50 is in contact with but not fixed to the drive shaft 18 and the weight 51, the rubberlike body 50 can move relative to the drive shaft 18 and the weight 51. This produces friction, which serves to absorb torsional vibrations.

The operation of the compressor will now be described. Power generated by the external drive source E is constantly transmitted to the pulley 23 of the clutch 21 by the belt 22. Thus, the pulley 23 is rotated constantly when the external drive source E is operating. When a cooling load is applied to the external refrigerant circuit, the solenoid 26 is excited to attract the armature 25 onto the front surface of the pulley 23 against the urging force of the leaf spring 28. This connects the drive shaft 18 to the external drive force E. When the cooling load applied to the external drive source E becomes null, the solenoid 26 is de-excited thereby causing the urging force of the leaf spring 28 to separate the armature 25 from the pulley 23. This disconnects the drive shaft 18 from the external drive source E.

When the drive shaft 18 is rotated by the external drive source E, the swash plate 34 rotates in the crank chamber 33 and reciprocates each piston 31 in the associated set of cylinder bores 29, 30 by means of the shoes 35. The reciprocation of the pistons 31 draws refrigerant gas into the crank chamber 33 from the external refrigerant circuit through the compressor inlet. The refrigerant gas in the crank chamber 33 is then drawn into the associated suction chamber 37, 38 through the suction passages 41. When either head of each piston 31 enters the suction stroke, the head moves from the top dead center to the bottom dead center and decreases the pressure in the associated compression chamber 32. This opens the associated suction flap 45 and draws refrigerant gas into the compression chamber 32 through the associated suction port 43.

As the head of the piston 31 enters the compression/discharge stroke and moves from the bottom dead center to the top dead center, the refrigerant gas in the compression chamber 32 is compressed to a predetermined pressure. The compressed refrigerant gas then opens the associated discharge flap 46. This discharges the refrigerant gas into the associated discharge chamber 39, 40 through the corresponding discharge port 44. The compressed refrigerant gas is then sent out of the discharge chambers 39, 40 through the discharge passage 42 and the compressor outlet. The external refrigerant circuit includes a condenser, an expansion valve, and an evaporator, which use the refrigerant gas compressed by the compressor to air-condition the passenger compartment of a vehicle.

During operation of the compressor, the compressing action of the each piston 31 results in the refrigerant gas producing compression reaction that acts on the drive shaft 18 by way of the piston 31 and the swash plate 34. The compression reaction fluctuates. This, in turn, fluctuates the rotational force, or the torque, applied to the drive shaft 18. The torque fluctuation generates torsional vibrations of the drive shaft 18, the swash plate 34, and the clutch 21, all of which rotate integrally. The drive shaft 18, the swash plate 34, and the clutch 21 define a single rotating member. As shown by the dotted line in the graph of FIG. 4, the torsional vibrations becomes greatest at frequency F1, which is equal to the natural frequency of the rotating member. In the graph, the amplitude of the torsional vibrations is shown as the torque fluctuation in the rotating direction of the rotating member.

Figure 5:
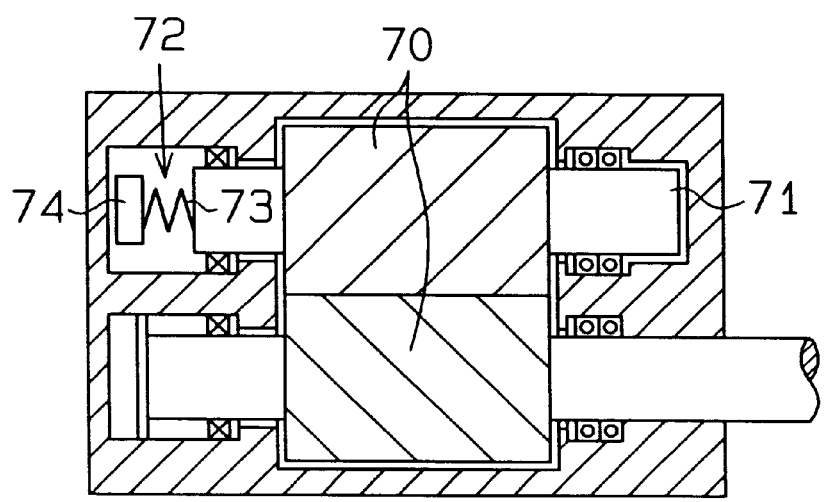
FIG. 5 is a cross-sectional view showing a damper employed in a prior art screw compressor.

The damper 48 is coupled to and rotates integrally with the drive shaft 18, which forms part of the rotating member. Accordingly, the damper 48 is torsionally vibrated together with the rotating member by way of the metal pin 49, which serves as a spring member 49. In the preferred embodiment, the mass of the weight 51 and the spring constant of the metal pin 49 are determined such that the natural frequency of the damper 48 coincides with that of the rotating member. Thus, the torsional vibrations of the damper 48 becomes maximum at frequency F1 (refer to FIG. 4), at which the torsional vibrations of the rotating member becomes maximum. The torsional vibrations of the weight 51 offset the torsional vibrations of the rotating member and consequently lower the torsional vibration peak of the rotating member as shown by the solid line of the graph of FIG. 4. Furthermore, the rubberlike body 50, which does not have a significant effect as a spring, absorbs the torsional vibrations of the rotating member. Therefore, unlike the prior art shown in FIG. 5, the torsional vibration peak does not appear outside the frequency range about frequency F1, which is the natural frequency of the damper 48.

Accordingly, the torsional vibrations of the rotating member, which includes the drive shaft 18, is decreased in an optimal manner in the preferred embodiment. This securely decreases vibrations and suppresses noise.

The spring constant of the rubberlike body 50 is relatively small such that the spring constant does not influence the natural frequency of the damper 48. Accordingly, the natural frequency of the damper 48 is accurately and easily matched with that of the rotating member by adjusting the mass of the weight 51 and the spring constant of the metal pin 49 without taking into account the vibration absorbing effect of the rubberlike body 50. Furthermore, the vibration absorbing level of the rubberlike body 50 may be set without taking into account the natural frequency of the damper 48. Thus, the damper 48 is easily provided with the preferred characteristics.

The spring constant of the metal pin 49 substantially does not change throughout the operational temperature range of the compressor. In addition, the spring constant of the rubberlike body 50 is small and does not significantly influence the natural frequency of the damper 48. Thus, the natural frequency of the damper 48 remains substantially unchanged even if the temperature in the compressor changes. Accordingly, the natural frequency of the damper 48 constantly coincides with the natural frequency of the rotating member regardless of temperature changes. Thus, the torsional vibration dampening effect of the damper 48 is not influenced by temperature changes.

The preferred and illustrated embodiment employs a single metal pin 49, which is covered by the tubular rubberlike body 50. This simplifies the structure of the damper 48. Furthermore, the rubberlike body 50 and the metal pin 49 are assembled just by fitting the rubberlike body 50 to the metal pin 49.

It should be apparent to those skilled in the art that the present invention may be embodied in many other specific forms without departing from the spirit or scope of the invention. More particularly, the present invention may be embodied as described below.

In the embodiment of FIGS. 1 to 3, the metal pin 49 and the weight 51 are separate bodies. However, the metal pin 49 and the weight 51 can be formed integrally with each other and screwed onto the drive shaft 18. In this case, a key is arranged between the metal pin 49 and the drive shaft 18 to prevent loosening of the metal pin 49.

The metal pin 49 may also be formed integrally with either one of the weight 51 and the drive shaft 18 and welded to the other one of the weight 51 and the drive shaft 18. Alternatively, the metal pin 49 may be an independent component that is welded or threaded to the drive shaft 18 and the weight 51. If the metal pin 49 is threaded, a device for preventing loosening, such as a key, should be employed.

More than one metal pin 49 may be arranged between the drive shaft 18 and the weight 51. In this case, the rubberlike body 50 may be formed to cover a plurality of metal pins 49.

In the preferred embodiment illustrated in FIGS. 1 to 3, the rubberlike body 50 is shown contacting the metal pin 49. In this state, significant relative movement does not occur between the rubberlike body 49 and the metal pin 49. However, the rubberlike body 50 need not contact the metal pin 49. Thus, a space may be formed between the metal pin 49 and the tubular rubberlike body 50, which encompasses the metal pin 49. Alternatively, the drive shaft 18 and the weight 51 may be connected to each other by one or more solid rubberlike pillars or by one or more metal pins.

The rubberlike body 50 need not be fitted to the metal pin 49 and may be formed to incorporate the metal pin 49 from the beginning. Furthermore, the damper 48 may be arranged at the front end of the drive shaft 18 outside the compressor housing.

The present invention may be applied to any type of compressor such as a wobble plate compressor, a vane compressor, or a screw compressor. The present invention may also be applied to fixed displacement compressors in addition to variable displacement compressors. The present invention may further be applied to compressors employed in air-conditioners for watercrafts and aircrafts.

Therefore, the present examples and embodiments are to be considered as illustrative and not restrictive, and the invention is not to be limited to the details given herein, but may be modified within the scope and equivalence of the appended claims.

What is claimed is:

1. A compressor having a rotating member, which includes an integrally rotating drive shaft, a compressing member driven by the rotating member to compress fluid, which causes torsional vibrations of the rotating member, and a damper for decreasing the torsional vibrations of the rotating member, the damper having a natural frequency substantially equal to that of the rotating member, wherein the damper comprises:
   a spring member coupled to the rotating member, wherin the spring member functions as a torsional spring acting in the direction of the torsional vibration and is made of a material having a spring constant that remains substantially within the operating temperature range of the compressor;
   a weight coupled to the rotating member by the spring member, wherein the weight is vibrated torsionally with the rotating member by the spring member to offset the torsional vibrations of the rotating member, and wherein the natural frequency of the damper is determined mainly by the mass of the weight and the spring constant of the spring member; and
   an absorbing member arranged between the rotating member and the weight to absorb torsional vibrations of the rotating member, wherein the absorbing member has a spring constant smaller than that of the spring member such that the natural frequency of the damper is substantially unaffected by the absorbing member wherein the spring member and the absorbing member each independently connects the rotating member to the weight.

2. The compressor according to claim 1, wherein the absorbing member includes a rubberlike body.

3. The compressor according to claim 1, wherein the spring member includes a metal pin.

4. The compressor according to claim 3, wherein the absorbing member is tubular to surround the metal pin.

5. The compressor according to claim 3, wherein the metal pin is formed integrally with the drive shaft.

6. The compressor according to claim 5, wherein the metal pin has an end including male threads, and wherein the weight includes female threads to engage the male threads.

7. The compressor according to claim 1, wherein the rotating member includes a swash plate supported to rotate integrally with the drive shaft, and wherein the compressing member includes a piston coupled to the swash plate, the piston being reciprocated by the rotation of the swash plate.

8. The compressor according to claim 7, wherein the rotating member further includes a clutch arranged between an external drive source and the drive shaft to selectively connect and disconnect the external drive source and the drive shaft.

9. The compressor according to claim 7 further having a housing for accommodating the drive shaft and the swash plate, wherein the housing includes a suction chamber, a cylinder bore for retaining the piston, and a discharge chamber, wherein the piston draws fluid into the cylinder bore from the suction chamber and discharges fluid compressed in the cylinder bore into the discharge chamber, and wherein the damper is located in the suction chamber.

10. A compressor employed in a vehicle air-conditioner, wherein the compressor comprises:
    a drive shaft;
    a swash plate supported to rotate integrally with the drive shaft, the swash plate and the drive shaft defining a rotating member;
    a piston coupled to the swash plate and reciprocated by the rotation of the swash plate to compress fluid, wherein compression of the fluid by the piston causes torsional vibrations of the rotating member;
    a damper for decreasing the torsional vibrations of the rotating member, the damper having a natural frequency substantially equal to that of the rotating member, wherein the damper includes a metal pin extending from an end of the drive shaft, the metal pin acting as a torsional spring in the direction of the torsional vibration, the metal pin having a spring constant that remains substantially the same within the operating temperature range of the compressor;
    a weight coupled to the rotating member by the metal pin, wherein the weight is vibrated torsionally with the rotating member by the metal pin to offset the torsional vibrations of the rotating member, and wherein the natural frequency of the damper is determined mainly by the mass of the weight and the spring constant of the metal pin; and
    an elastomeric body arranged between the drive shaft and the weight to absorb the torsional vibrations of the rotating member, wherein the elastomeric body has a spring constant smaller than that of the metal pin such that the natural frequency of the damper is substantially unaffected by the elastomeric body, wherein the damper and the elastomeric body each independently connects the rotating member to the weight.

11. The compressor according to claim 10, wherein the elastomeric body is tubular to surround the metal pin.

12. The compressor according to claim 10, wherein the metal pin is formed integrally with the drive shaft.

13. The compressor according to claim 12, wherein the metal pin has an end including male threads, and wherein the weight includes female threads to engage the male threads.

14. The compressor according to claim 10, wherein the rotating member further includes a clutch arranged between an external drive source and the drive shaft to selectively connect and disconnect the external drive source and the drive shaft.

15. The compressor according to claim 10 further having a housing for accommodating the drive shaft and the swash plate, wherein the housing includes a suction chamber, a cylinder bore for retaining the piston, and a discharge chamber, wherein the piston draws fluid into the cylinder bore from the suction chamber and discharges fluid compressed in the cylinder bore into the discharge chamber, and wherein the damper is located in the suction chamber.

* * * * *